No. 871,925. PATENTED NOV. 26, 1907.
S. E. GATES.
HALTER.
APPLICATION FILED APR. 22, 1907.
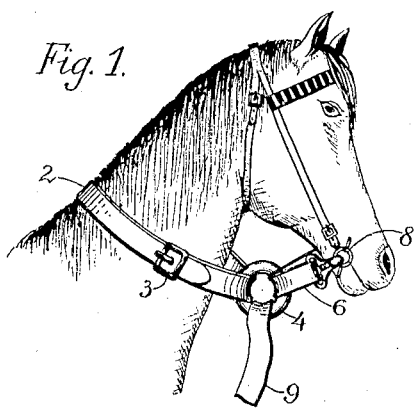
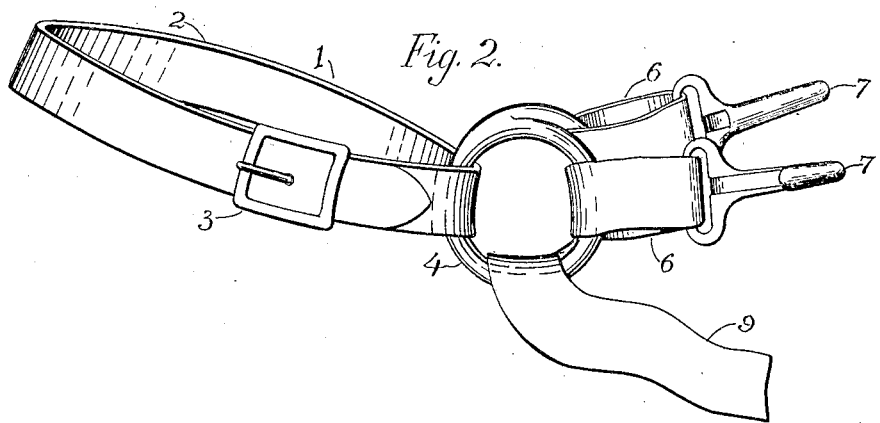
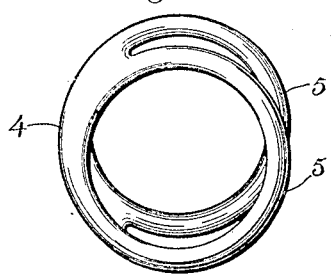

UNITED STATES PATENT OFFICE.

SILAS EDWIN GATES, OF BIGTIMBER, MONTANA.

HALTER.

No. 871,925.  Specification of Letters Patent.  Patented Nov. 26, 1907.

Application filed April 22, 1907. Serial No. 369,480.

*To all whom it may concern:*

Be it known that I, SILAS EDWIN GATES, a citizen of the United States, residing at Bigtimber, in the county of Sweet Grass and State of Montana, have invented certain new and useful Improvements in Halters; and I do declare the following to be a full, clear, and exact description of the invention, such as will enable others skilled in the art to which it appertains to make and use the same.

This invention relates to improvements in halters.

The object of the invention is to provide a halter which will be simple, strong and durable in construction, efficient and reliable in operation, and which may be quickly applied to, and removed from, the head of an animal.

With this object in view, the invention consists in certain novel features of construction, combination and arrangements of parts as will be more fully described and particularly pointed out in the claims.

In the accompanying drawings, Figure 1 is a perspective view showing the application of the device; Fig. 2 is a similar view of the halter removed; and Fig. 3 is a detail perspective view of the double ring forming part of the halter.

Referring more particularly to the drawings, 1 denotes the halter, which consists of a neck strap, 2, provided with a buckle, 3, by means of which the same may be secured to the neck of a horse, or animal, to which the halter is applied. The neck strap 2 extends downwardly beneath the jaw and is connected to the upper side of a double ring, 4.

The lower portion of the double ring 4 is bifurcated to form two loops or eye members, 5, which diverge toward their lower edges, as shown. To the loops or eye members 5 are connected short bit straps, 6, to the opposite ends of which are connected snap hooks, 7, by means of which the lower end of the halter is adapted to be attached to the bit rings, 8, on each side of the animal's mouth.

Connected to the double ring 4 above the bifurcated portion thereof, is the inner end of a hitching strap, 9, the opposite end of which is adapted to be tied or otherwise fastened to a hitching post or other object to which it is desired to fasten the animal.

A halter constructed as herein shown and described, may be quickly and easily applied to the head of a horse, and will provide a simple and efficient hitching device, by means of which the animal may be securely fastened, or tied to any suitable object.

From the above description, taken in connection with the accompanying drawings, the construction and operation of this invention may be readily understood without requiring a more extended explanation.

Various changes in the form, proportion and the minor details of construction may be resorted to without departing from the principle or sacrificing any of the advantages of this invention as defined in the appended claims.

Having thus fully described my invention, what I claim as new, and desired to secure by Letters-Patent, is:

A halter comprising a neck-strap, a ring having said neck-strap passed through it and having formed integrally with it diverging ring-members, separated independent bit controlling loops connecting with said ring-members, snap-hooks connected with the bit and having said loops passed through them and a hitching strap also passed through and connected to said ring, said ring being adapted to occupy a position intermediate of said neck-strap and said bit-controlling loops and to accordingly draw upon these parts when subjected to a pulling action.

In testimony whereof I have hereunto set my hand in presence of two subscribing witnesses.

SILAS EDWIN GATES.

Witnesses:
JOHN A. ELLIOT,
GEORGE W. POST.